(12) United States Patent
Hardy et al.

(10) Patent No.: US 7,907,795 B2
(45) Date of Patent: Mar. 15, 2011

(54) TWO-DIMENSIONAL MEASUREMENT SYSTEM

(75) Inventors: Stephen James Hardy, West Pymble (AU); Peter Alleine Fletcher, Rozelle (AU)

(73) Assignee: Canon Kabushiki Kaisha, Tokyo (JP)

( * ) Notice: Subject to any disclaimer, the term of this patent is extended or adjusted under 35 U.S.C. 154(b) by 924 days.

(21) Appl. No.: 11/772,546

(22) Filed: Jul. 2, 2007

(65) Prior Publication Data
US 2008/0049268 A1 Feb. 28, 2008

(30) Foreign Application Priority Data
Jul. 14, 2006 (AU) ................................ 2006203027

(51) Int. Cl.
*G06K 9/36* (2006.01)
(52) U.S. Cl. ......... 382/289; 382/286; 382/274; 358/504; 358/525; 358/406
(58) Field of Classification Search .................. 382/289, 382/286, 276; 358/504, 525, 406
See application file for complete search history.

(56) References Cited

U.S. PATENT DOCUMENTS

| 5,652,412 | A | 7/1997 | Lazzouni et al. | |
| 5,675,129 | A | 10/1997 | Burns et al. | |
| 5,937,110 | A | 8/1999 | Petrie et al. | |
| 6,483,538 | B2 * | 11/2002 | Hu | 348/180 |
| 6,548,768 | B1 | 4/2003 | Pettersson et al. | 178/18.01 |
| 6,570,104 | B1 | 5/2003 | Ericson et al. | |
| 6,850,931 | B2 | 2/2005 | Silverbrook et al. | |
| 2004/0085587 | A1 | 5/2004 | Broddin et al. | 358/3.06 |
| 2008/0019611 | A1 * | 1/2008 | Larkin et al. | 382/287 |
| 2008/0151308 | A1 * | 6/2008 | Frei | 358/3.26 |

FOREIGN PATENT DOCUMENTS

WO WO2005/096218 * 10/2005 ................ 382/289

OTHER PUBLICATIONS

U.S. Appl. No. 10/598,939, filed Jul. 11, 2007.

* cited by examiner

*Primary Examiner* — Benny Q Tieu
*Assistant Examiner* — Paul F Payer
(74) *Attorney, Agent, or Firm* — Fitzpatrick, Cella, Harper & Scinto

(57) ABSTRACT

A system (100) and a method (500) are described for determining a two-dimensional position of a location in an image. The method (500) starts by imaging (510) a two-dimensional pattern (440). The two-dimensional pattern comprises a plurality of at least partially overlapping two-dimensional sub-patterns (410, 420, 430). The sub-patterns (410, 420, 430) repeat with different spatial periods to form the two-dimensional pattern, and the spatial period of the sub-patterns are anharmonic. A two-dimensional offset for each of the sub-patterns is then determined (540) at the location in the image formed by the imaging. The two-dimensional position is determined from said two-dimensional offsets.

12 Claims, 8 Drawing Sheets

TWO-DIMENSIONAL MEASUREMENT SYSTEM

CROSS-REFERENCE TO RELATED PATENT APPLICATIONS

This application claims the right of priority under 35 U.S.C. §119 based on Australian Patent Application No. 2006203027, filed Jul. 14, 2006, which is incorporated by reference herein in its entirety as if fully set forth herein.

FIELD OF THE INVENTION

The present invention relates generally to measurement systems and, in particular, to the determination of two-dimensional position information using an optical imaging device.

BACKGROUND

Digital imaging devices generally sample a real world object onto a rectangular grid of pixels. Different imaging devices have different spatial configurations of the sampled pixels with respect to the object that is being imaged. For instance, while a camera with a digital sensor will generally have a rectangular array of sensor sites, spatial inaccuracies are introduced by the imaging system of the camera cause the sampled image not to be a faithful reproduction of the spatial configuration of the light that entered the imaging system. A common example of such an inaccuracy is barrel distortion whereby the light to be sampled by the digital sensor of the camera is radially distorted by optical effects caused by compromises made in the design of the lens of the camera.

Another imaging system that introduces spatial distortions is a flatbed scanner. In this case the image is generally sampled by a line (or lines for colour scanners) of sensors that is moved across the platen of the scanner by a drive motor. Flatbed scanners suffer from optical distortions similar to those that affect cameras due to the presence of imaging optics and also suffer from further spatial distortions due to variations in the rate at which the line of sensors is driven across the scanner platen.

The spatial distortions introduced by the imaging optics and sensor package of an imaging device restrict the utility of such imaging devices as tools for measuring the precise position and dimensions of objects imaged by the device. For instance, if there were no spatial distortion in a flatbed scanner, it may be used to accurately measure the relative position between any features on a flat surface placed on the platen of the scanner.

Current methods of accurately measuring positions on a surface include two-dimensional rulers and two-dimensional position code systems.

A two-dimensional ruler is, as its name would suggest, similar in concept to a one dimensional ruler except it is extended to two dimensions. A two-dimensional ruler generally consists of a regular rectangular grid of points or lines at known spacing produced on a transparent substrate using a highly accurate process. The grid points or lines are generally marked with two-dimensional scale labels with varying graduation sizes. Such two-dimensional rulers are used by imaging a feature to be measured through the grid of points or lines, reading off the labels associated with the graduations closest to the feature of interest, and interpolating the position of the feature of interest between the closest grid points or lines. For instance, a current commercially available two-dimensional ruler has a grid of lines spaced at a finest resolution of 1 mm. The lines are nominally accurate to 0.002 mm.

Clearly, if the feature of interest lies in between two grid points or lines, the interpolation step introduces inaccuracies into the measurement and limits the precision of the measurement in an undesirable way.

A two-dimensional position code may also be used to determine the position of a feature on a surface. A two-dimensional position code is a set of symbols that is recorded on a medium, with the symbols encoding two-dimensional position on the medium. A variety of position codes are known in the art. One of the known position codes encodes a binary pattern by placing large and small dots on a surface in a rectangular array. A large dot may encode a binary one and a small dot encodes a binary zero. The binary pattern placed on the surface is specially constructed such that given some number of consecutive digits of the pattern in the vertical direction, the absolute position of those digits within the pattern can be determined. A similar scheme is used to encode the horizontal position. These patterns may be used by imaging the feature to be measured through the two-dimensional position code and by decoding the pattern around the position of the feature, thereby revealing its position with respect to the pattern.

The fundamental drawback with the position codes based on the sizes of dots is that, to decode the pattern, it is necessary to be able to discriminate between the different dot sizes to determine the binary pattern which contains the position code. This in general means that each dot in the representation of the position code must be at least a pixel in size after imaging, and often several pixels are covered by the dot. Apart from the possibility of obscuring the feature to be measured, this restricts the accuracy of this method to more than a pixel dimension. Given that the pixel dimension on a good flatbed scanner is around 10 microns, this limits the utility of such position code based systems.

SUMMARY

It is an object of the present invention to substantially overcome, or at least ameliorate, one or more disadvantages of existing arrangements.

Disclosed are arrangements which seek to determine a two-dimensional position of a location in an image by imaging a particular two-dimensional pattern. The two-dimensional pattern comprises a number of at least partially overlapping two-dimensional sub-patterns. The sub-patterns repeat with different spatial periods. Also, the spatial periods of the sub-patterns are anharmonic. The image formed by said imaging is then analysed to determine a two-dimensional offset for each of the sub-patterns at the location, and the two-dimensional position is determined from the two-dimensional offsets.

According to a first aspect of the present invention, there is provided a method of determining a two-dimensional position of a location in an image, said method comprising the steps of:

imaging a two-dimensional pattern, said two-dimensional pattern comprising a plurality of at least partially overlapping two-dimensional sub-patterns, wherein said sub-patterns repeat with different spatial periods in at least one dimension to form said two-dimensional pattern, and wherein the spatial periods of the sub-patterns are anharmonic;

determining a two-dimensional offset for each of said sub-patterns at said location in the image formed by said imaging step; and determining said two-dimensional position from said two-dimensional offsets.

According to a second aspect of the present invention, there is provided an apparatus for determining a two-dimensional position of a location in an image, said apparatus comprising:

an imaging device for imaging a two-dimensional pattern, said two-dimensional pattern comprising a plurality of at least partially overlapping two-dimensional sub-patterns, wherein said sub-patterns repeat with different spatial periods in at least one dimension to form said two-dimensional pattern, and wherein the spatial periods of the sub-patterns are anharmonic;

means for determining a two-dimensional offset for each of said sub-patterns at said location in the image formed by said imaging step; and means for determining said two-dimensional position from said two-dimensional offsets.

Other aspects of the invention are also disclosed.

BRIEF DESCRIPTION OF THE DRAWINGS

One or more embodiments of the present invention will now be described with reference to the drawings, in which.

DETAILED DESCRIPTION

Figure 1:
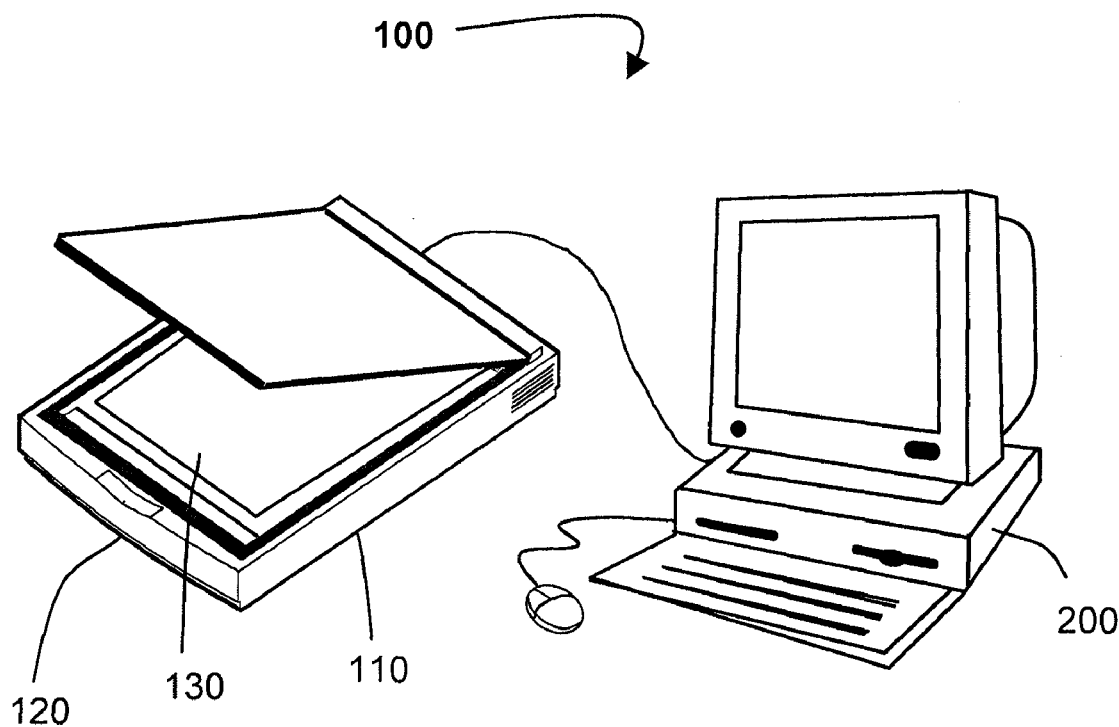
FIG. 1 shows a measurement system for determining a two-dimensional position of a location on a surface imaged by the system.

Where reference is made in any one or more of the accompanying drawings to steps and/or features, which have the same reference numerals, those steps and/or features have for the purposes of this description the same function(s) or operation(s), unless the contrary intention appears.

FIG. 1 shows a measurement system 100 for determining a two-dimensional position of a location on a surface imaged by the system 100. The measurement system 100 comprises a flat bed scanner 120, attached to a computer 200.

Due to spatial distortions introduced by the scanner 120, positions on the surface imaged by the system 100 do not directly correspond with pixel positions of a digital image resulting from scanning the surface. Therefore, the scanner 120 includes a platen 110, which is prepared with a special pattern 130 on its surface. The special pattern 130, which is described in detail below, enables the precise estimation of a position relative to the pattern 130 rather than merely relying on the pixel position containing a feature of interest.

Figure 2:
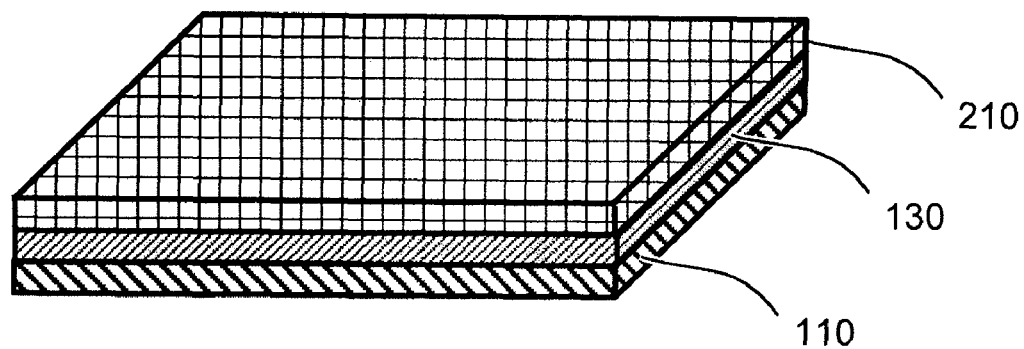
FIG. 2 illustrates the relative position of a scanner platen, a two-dimensional surface pattern and the surface to be imaged.

The relationship between the surface pattern 130, the scanner platen 110 and the surface to be measured 210, is further illustrated in FIG. 2. The surface pattern 130 is preferably manufactured onto the platen 110 such that the pattern 130 is positioned between the platen 110 and the surface to be measured 210. It is also preferred that the surface pattern 130 has a particular geometrical relationship to the scanner platen 110. The surface pattern 130 is preferably manufactured onto the scanner platen 110 and the scanner platen 110 is placed in the scanner 120 such that the orientation of the surface pattern 130 is substantially aligned with the scan direction of the scanner 120.

A position measurement is performed in the measurement system 100 of FIG. 1 by scanning, thus imaging, the surface 210 to be measured through the surface pattern 130 manufactured onto the surface of the platen 110. In the present embodiment, and with the relationship between the surface 210 to be measured, the surface pattern 130, and the platen 110 being that illustrated in FIG. 2, any position on the surface 210 to be measured has a corresponding position on the surface pattern 130 and the platen 110.

The digital image resulting from the scan is transferred to the computer 200 where the digital image is stored. The pixels of the digital image include information resulting from the surface pattern 130. To determine the spatial (two-dimensional) position relative to the platen 110 of a feature in the digital image an application program is executed within the computer 200 which detects and analyses the properties of the pattern 130 around the pixel position of that feature and uses the detected properties to determine the corresponding spatial position on the platen 110.

Figure 9:
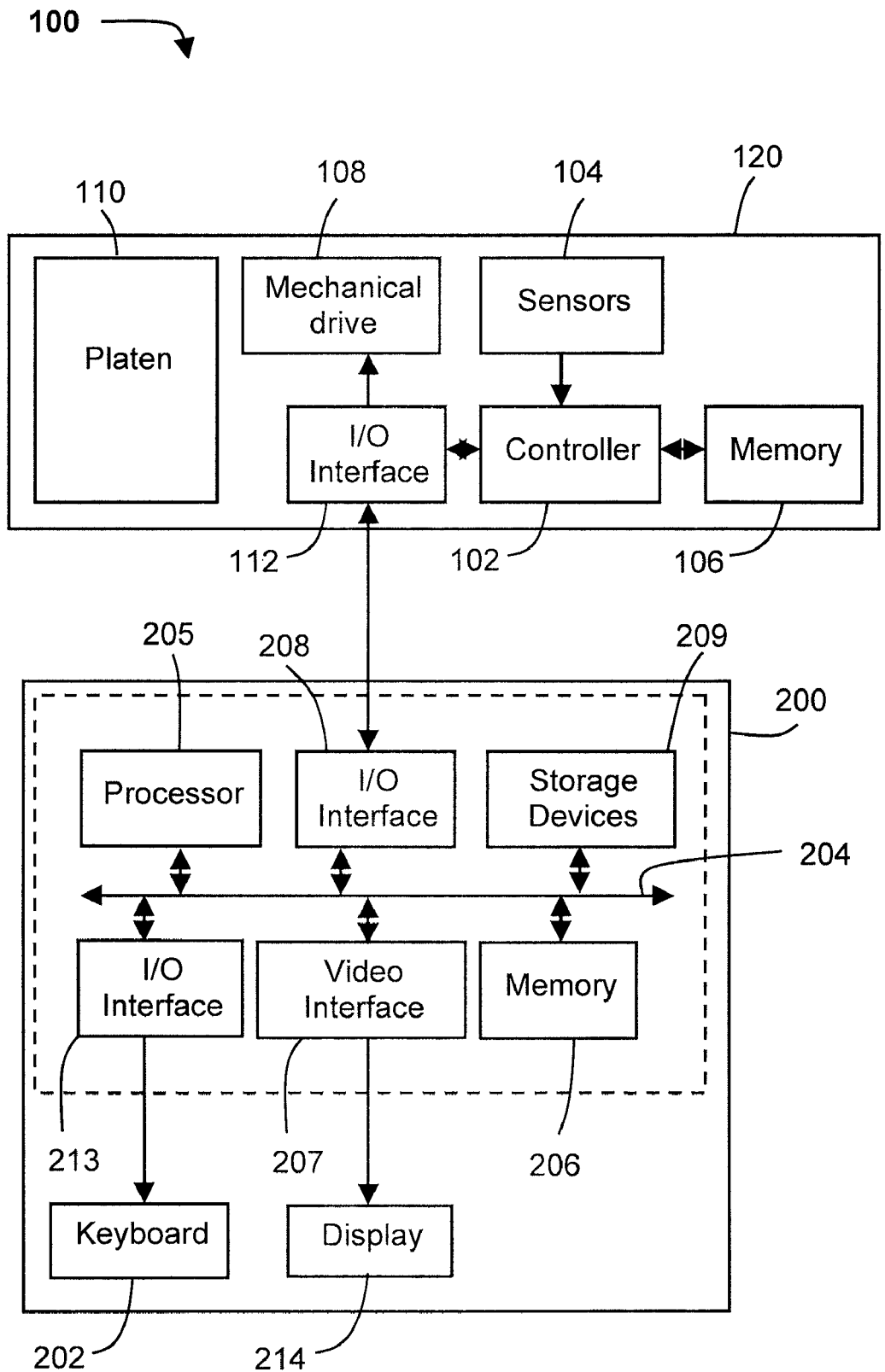
FIG. 9 shows a schematic block diagram of the measurement system 100 shown in FIG. 1.

FIG. 9 shows a schematic block diagram of the measurement system 100 shown in FIG. 1. The computer 200 typically includes at least one processor 205, a memory unit 206, storage devices 209, a number of input/output (I/O) interfaces, a keyboard 202 and a display 214. The I/O interfaces include a video interface 207 that couples to the display 214, an I/O interface 213 for the keyboard 202, and an interface 208 for the scanner 120. The storage devices 209 typically include a hard disk drive, a floppy disk drive and an optical disk drive. The components 205 to 213 of the computer 100 typically communicate via an interconnected bus 204 and in a manner which results in a conventional mode of operation of the computer 200 known to those in the relevant art.

The scanner 120 includes the platen 110, a controller 102, an array of sensors 104, memory 106 for storing data captured by the sensors 104, a mechanical drive 108 for driving the array of sensors 104 across the platen 110, and an I/O interface 112 for interfacing with the computer 200 and the mechanical drive 108.

Having described the measurement system 100 and the position measurement process generally, the surface pattern 130 is now described in more detail. In the preferred embodiment of the invention, the pattern 130 is manufactured onto the platen 110 by forming chrome particles on glass. The level of accuracy provided by the position measurement system 100 is determined by the accuracy of the surface pattern 130 formation process. For a target accuracy of 1 micron standard deviation using a flatbed scanner with optical resolution of around 1600 dots per inch (15.875 microns/pixel), the pattern 130 may be manufactured onto the platen 110 using a standard ultraviolet (UV) lithographic process with a minimum feature (mark) size of around 400 nm.

Figure 3:
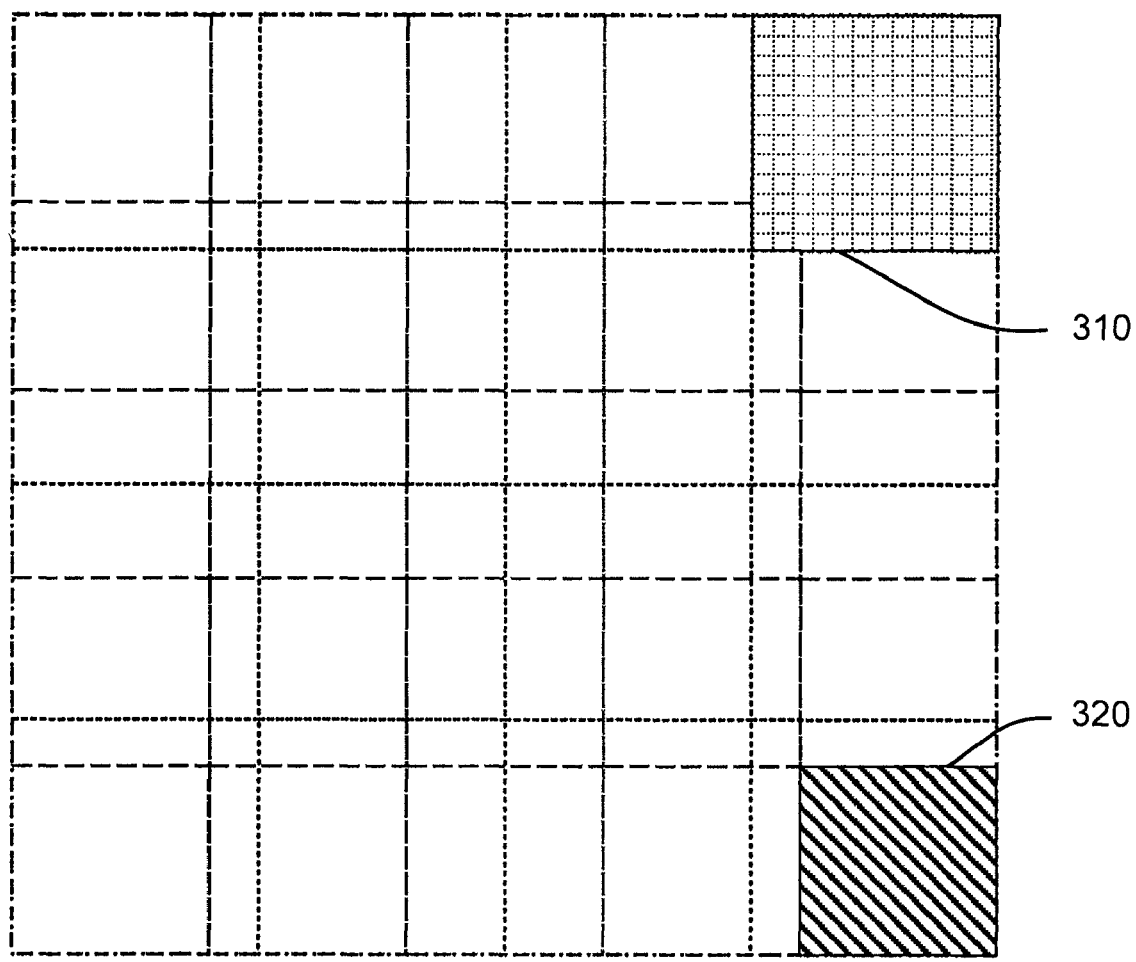
FIG. 3 illustrates the relative periodicities of the sub-patterns that make up the two-dimensional surface pattern.

The two-dimensional surface pattern 130 manufactured onto the scanner platen 110 consists of a number of sub-patterns. Each sub-pattern is a noise pattern which is repeated across the surface of the platen 110. FIG. 3 illustrates the manner in which two sub-patterns are repeated across the surface of the platen 110. A first square sub-pattern 310 of size N square is repeated across the platen 110 both horizontally and vertically. Similarly, a second square sub-pattern 320 of size 5N/4 square is also repeated across the platen both horizontally and vertically. The sub-patterns have different spatial periods. The sub-patterns have spatial periods that are anharmonic (not harmonic). Accordingly, the smaller of the spatial periods does no divide the larger of the spatial periods without a remainder. In other words, the ratio of the larger spatial period to the smaller spatial period has a fractional part. In a preferred implementation the spatial periods are relatively prime.

It is noted that the arrangement illustrated in FIG. 3 is illustrative only, other arrangements are possible, including two-dimensional sub-patterns having different aspect ratios, for example rectangular sub-patterns may be used. Also, the sub-patterns do not have to be positioned such that an edge of each sub-pattern coincide with that of another sub-pattern at any point on the platen 110. Each noise pattern has a marking density high enough for the sub-pattern to be detectable in the digital image, but low enough so as to not cause significant visual distortion of any feature on the imaged surface 210.

Figure 4:
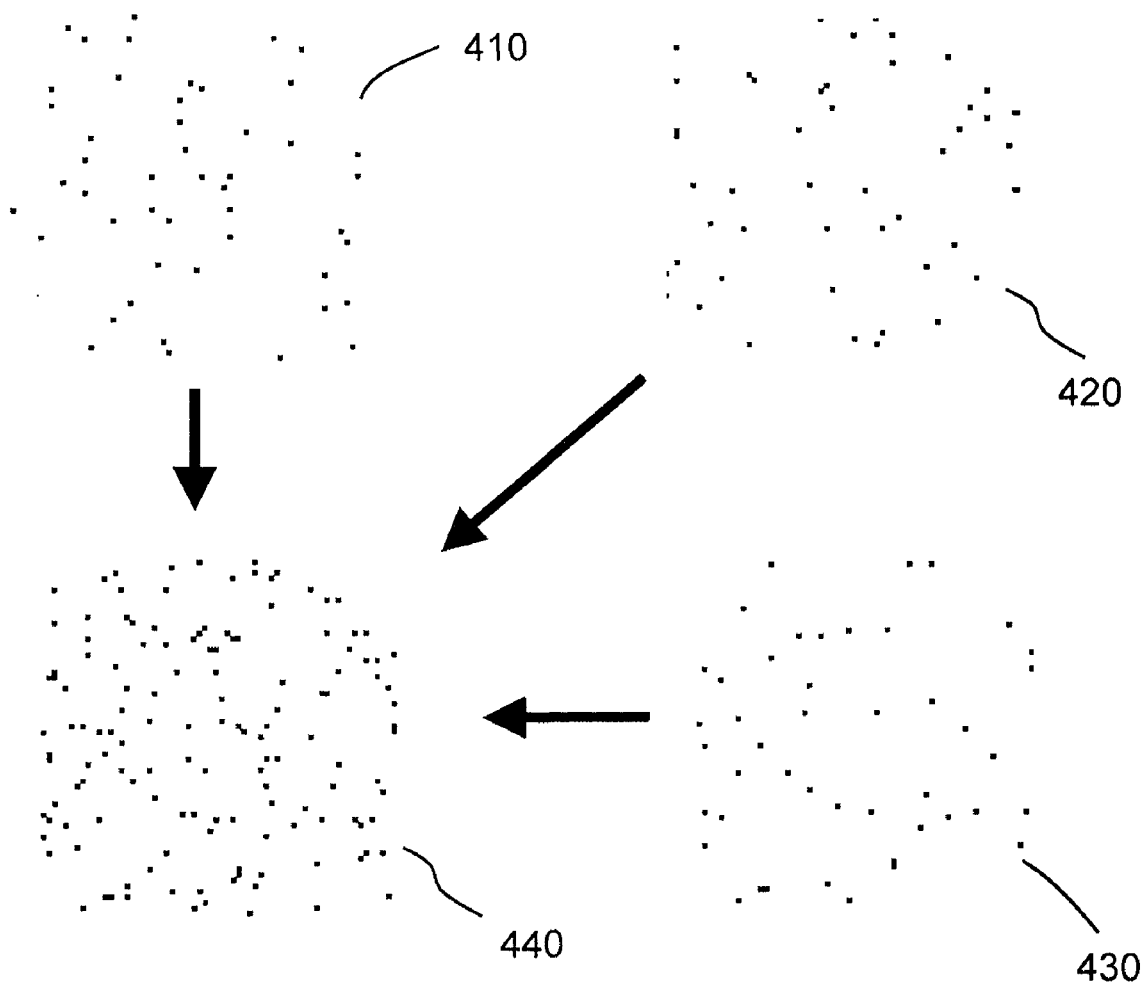
FIG. 4 is a representation of the manner in which different sub-patterns are combined to form the two-dimensional surface pattern.

In the preferred embodiment of the invention, three sub-patterns are repeated across the platen 110. Each sub-pattern consists of a two-dimensional pseudo-random noise pattern having a marking density of 1%. Each marking consists of a 4 micron square of chrome and each noise pattern is a square pattern with side lengths of 63, 64, and 65 grid positions respectively. As the sub-patterns are overlayed on top of each other, the patterns are combined with a Boolean OR function—that is, if any of the sub-patterns has a marking at any position on the platen 110, the combined pattern has a marking at that position. Due to the fact that the side lengths of each sub-pattern is relatively prime, the combined pattern repeats with a period of 262080 grid positions, which, output with a 4 micron marking size, is 1.04832 meters. For a scanner platen 110 that is smaller than this dimension, only a portion from the top left of the total combined pattern is used. A representation of individual sub-patterns 410, 420 and 430 as well as a combined pattern 440 is shown in FIG. 4.

More generally, each sub-pattern consists of a broad spectrum pattern. Autocorrelation of such a pattern provide a sharp peak.

Figure 5:
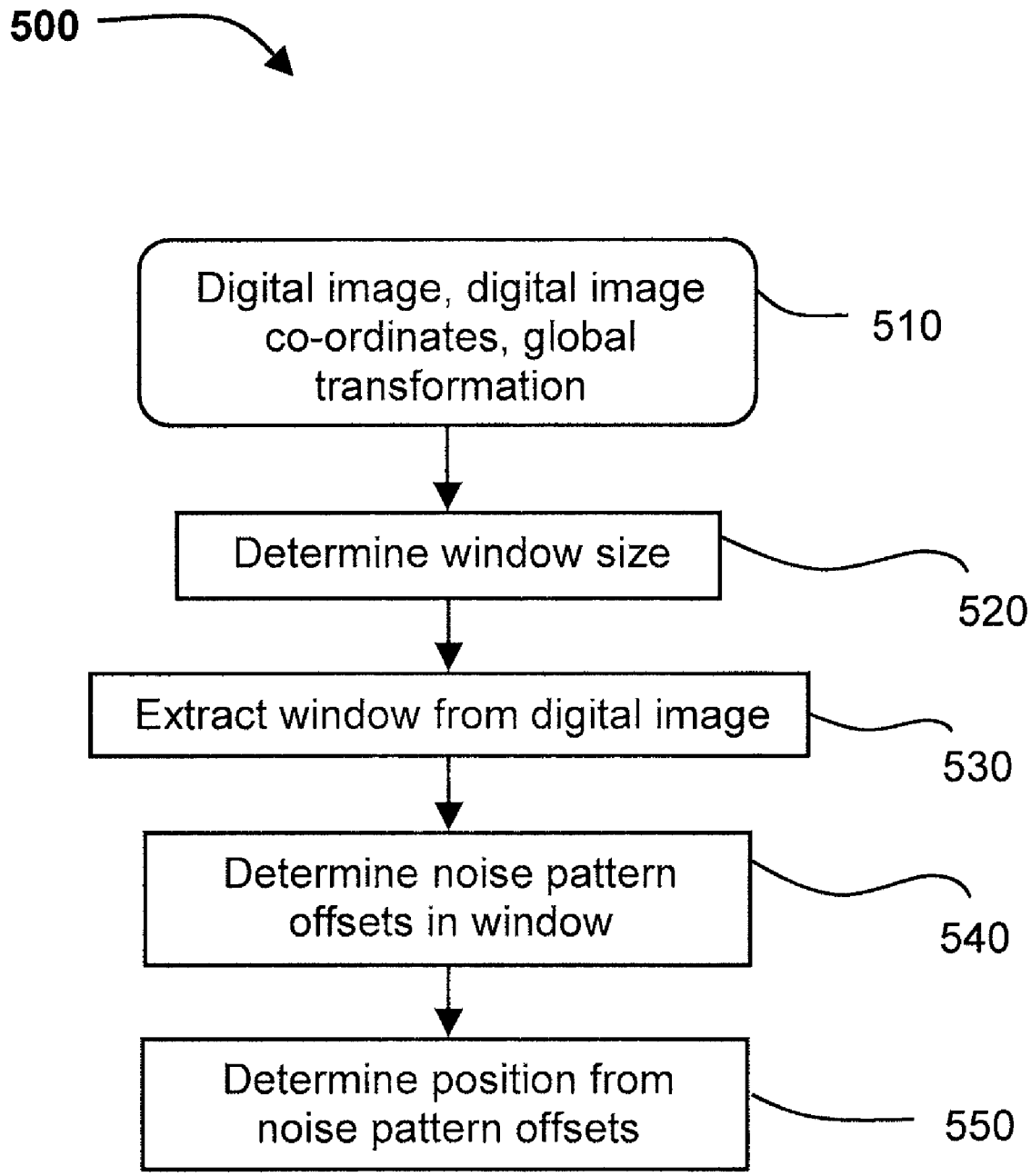
FIG. 5 is a schematic flow diagram of a method of analysing a digital image to determine a position on the surface imaged by the system shown in FIG. 1.

FIG. 5 shows a schematic flow diagram of a method 500 of analysing the digital image produce by the imaging of the surface 210 through the surface pattern 130. The method 500 receives as input the digital image, a pixel position in the digital image for which the spatial position with respect to the scanner platen 110 has to be determined. Also, it is assumed that the approximate scale relating the digital image coordinates to the grid of the pattern 130 is also known to within around 5%. The scale relating the digital image coordinates to the grid of the pattern may be determined from the resolution at which the digital image was scanned and the resolution at which the surface pattern 130 was formed. For the exemplary values of the scanner 120 operating at a resolution of 1200 dpi and a 4 micron marking size, the scale factor is 5.29167.

It is possible that the geometrical relationship between the digital image and the surface pattern 130 is not purely the combination of a scale and a translation. In particular, it is likely for there to also be some rotation between the digital image coordinates and the surface pattern 130. There may also be some general affine transformation due to anamorphic scaling resulting from, for example, barrel distortion caused by the imaging system of the scanner 120. However, it is assumed that the manufacturing and construction process of the scanner 120 has been sufficiently accurate that an initial estimate of position using the process outlined in FIG. 5 is possible.

In step 520 a window size over which the subsequent analysis is to be performed, is determined by the computer 200. In the preferred embodiment, this window size corresponds to 64 grid positions square. In the general case, the window size should be approximately the size of the noise patterns, but generally not smaller than 64 grid positions square.

In step 530, a window of the digital image which is centred on the input digital image coordinates is extracted from the digital image. This is followed by comparison of the window with each of the noise patterns present in the surface pattern 130 to determine the two-dimensional translational offsets between the respective noise patterns and the window in step 540. The combination of these two-dimensional offsets determines the position of the input digital image coordinates relative to the platen 110. This position is calculated from the two-dimensional offsets in step 550.

Figure 6:
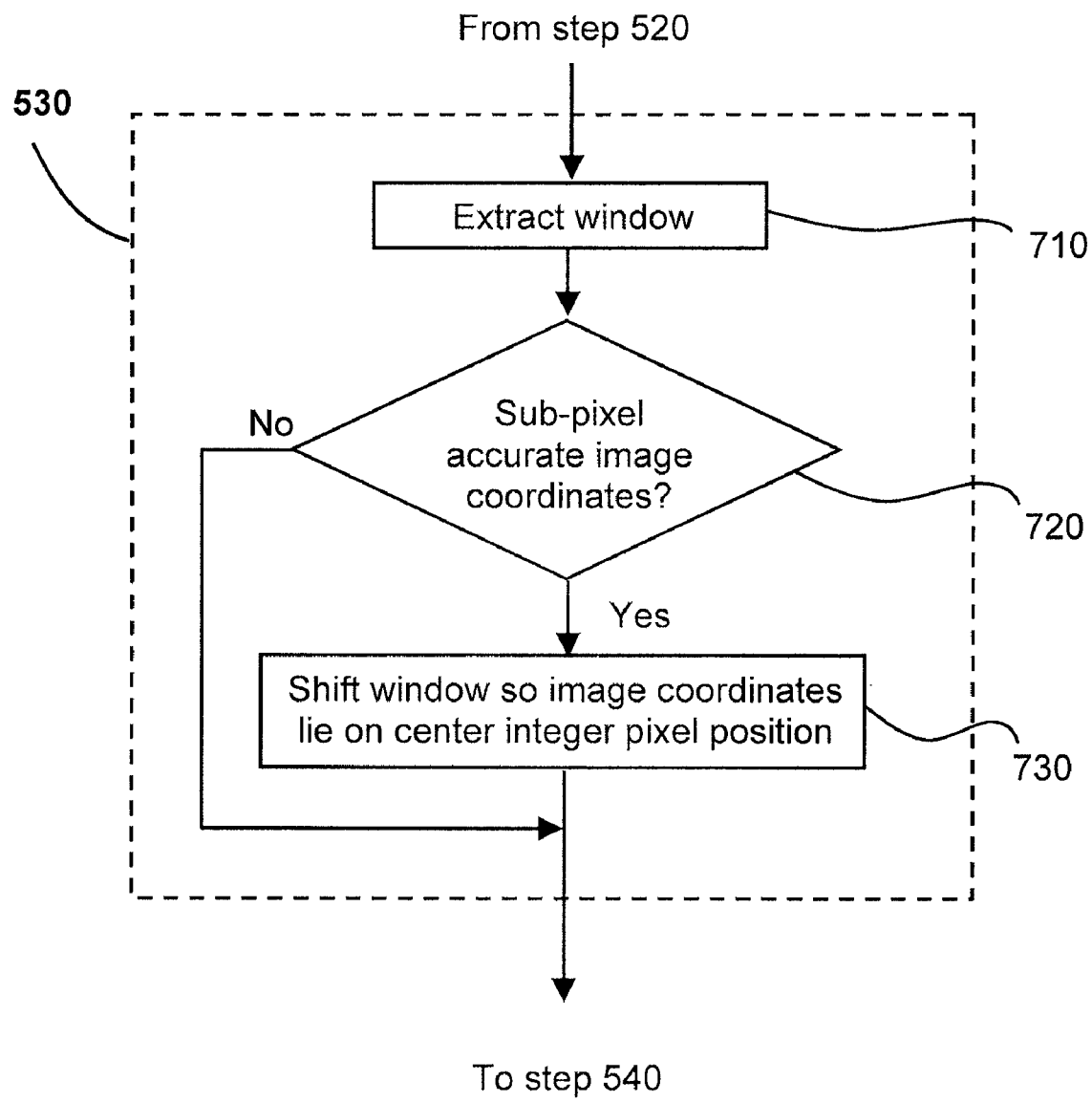
FIG. 6 is a schematic flow diagram of a step in the method of FIG. 5 where a window is extracted from the digital image.

Step 530 where the window of the digital image centred on the input digital image coordinates is extracted from the digital image, is now described in more detail with reference to FIG. 6 where a schematic flow diagram of step 530 is shown. Step 530 uses the digital image, the digital image coordinates, received in step 510, and the window size, determined in step 520, as inputs. The digital image coordinates are denoted $S_x$ and $S_y$. The digital image coordinates may be specified with fractional parts, in which case the rounded digital image coordinates are defined as $P_x=\text{floor}(S_x+0.5)$ and $P_y=\text{floor}(S_y+0.5)$. In the first sub-step 710 of step 530 a window of horizontal and vertical dimensions specified by the window size is extracted from the digital image, with the window being centred on the rounded digital image coordinates $(P_x, P_y)$. In sub-step 720 the computer 200 then determines whether the digital image coordinates $(S_x, S_y)$ were supplied to greater than integer pixel accuracy. If $P_x!=S_x$ or $P_y!=S_y$ then the digital image coordinates $(S_x, S_y)$ were supplied to sub-pixel precision. In that case sub-step 730 shifts the window extracted in sub-step 710 by the sub-pixel amount $(P_x-S_x, P_y-S_y)$ so that the centre of the window lies precisely on the input digital image coordinates $(S_x, S_y)$. A variety of methods of performing a sub-pixel shift are known in the art. In the preferred embodiment, the sub-pixel shift is performed by Fourier transforming the extracted window, multiplying the Fourier transformed window by a linear phase corresponding to the sub-pixel shift required, and applying an inverse Fourier transform to the result, thereby returning to the spatial domain.

Following sub-step 730, or in the case where the scan coordinates $(S_x, S_y)$ were input to integer pixel accuracy, the step 530 ends.

Figure 7:
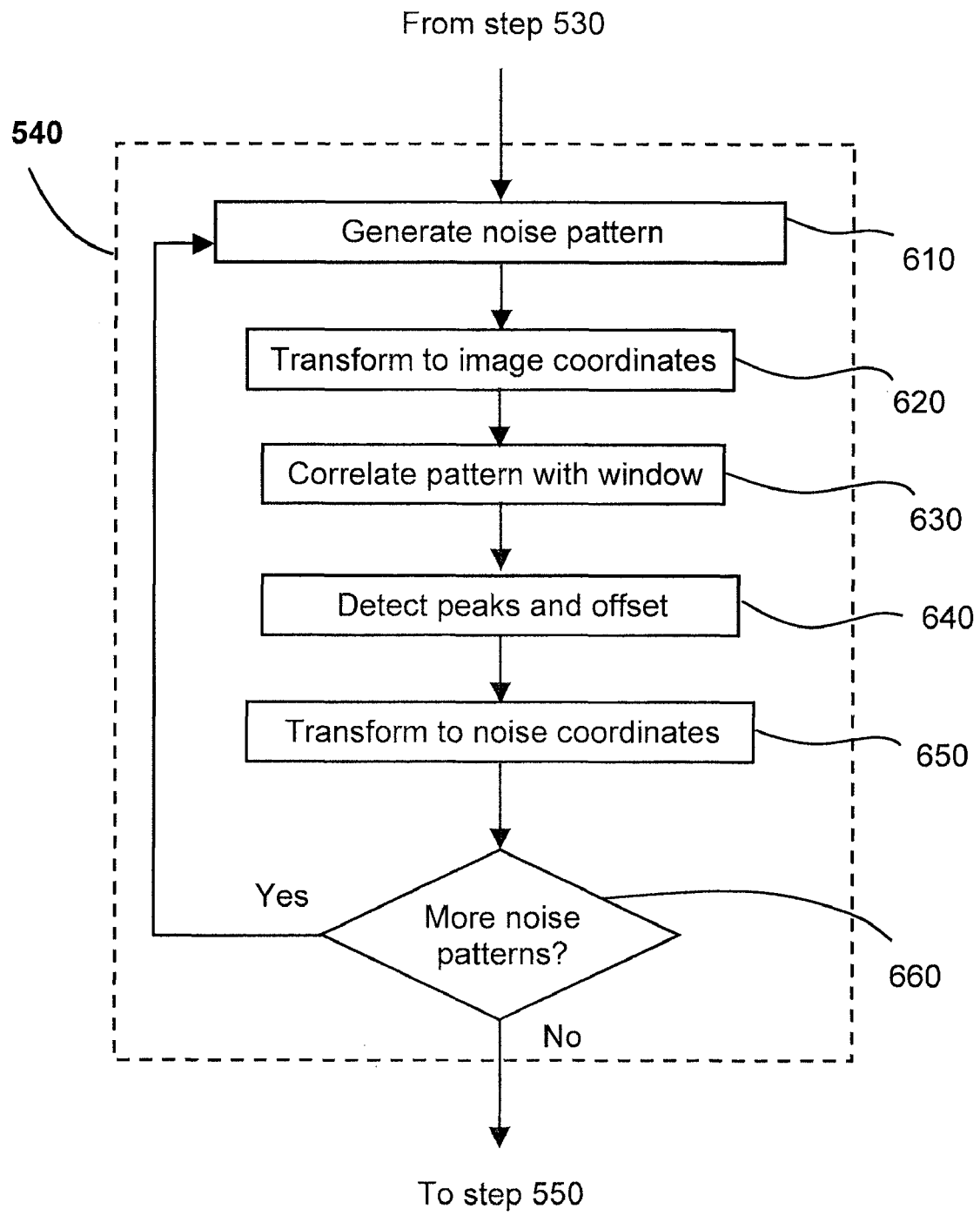
FIG. 7 is a schematic flow diagram of a step in the method of FIG. 5 where a comparison is made between the window and each of the sub-patterns present in the surface pattern.

FIG. 7 shows a schematic flow diagram of step 540 in more detail where a comparison is made between the window and each of the noise patterns present in the surface pattern 130. Step 540 produces a two-dimensional translational offset associated with each noise pattern. Step 540 uses as inputs the window extracted from the digital image in step 530, and the global transformation relating the coordinates of the digital image and the coordinates of the surface pattern 130. Step 540 starts in sub-step 610 where a current noise pattern is generated as a raster array in the digital memory of the computer 200. In sub-step 620 this raster array is transformed to the coordinate system of the window using the global transformation. Usually this will constitute a re-sampling process which consists of a down-sampling operation combined with the coordinate transformation. Many methods of re-sampling are known in the art and may be applied at sub-step 620. The preferred method of re-sampling is multisampling. After the noise pattern has been re-sampled to the same coordinate system as the window, the window and the current noise pattern are correlated in sub-step 630, whereby the two images are compared with different pixel offsets to determine which offset gives the best match between the images. The output of the correlation sub-step 630 is an image where the pixel values correspond to the strength of the correlation for the offset corresponding to that pixel. Many methods of correlation and matched filtering are known in the art. In the preferred embodiment, phase correlation is used.

After the correlation sub-step 630, the correlation image is searched for the highest peak in sub-step 640 and the location of that peak. The location of the peak specifies the two-dimensional offset between the noise pattern and the window. The peak position may be interpolated to determine its position (and hence the two-dimensional offset) more precisely. In the preferred embodiment the peak is interpolated using the interpolation method 800 described below with reference to FIG. 8.

At this point the two-dimensional offset between the noise pattern and the window has been determined in the coordinate system of the digital image. The two-dimensional offset is in sub-step 650 transformed back to the coordinate system of the noise pattern using the inverse of the global transformation used in sub-step 620.

It is determined in sub-step 660 whether more noise patterns exist. In the case where more noise patterns exist, step 540 returns to sub-step 610 from where sub-steps 610 to 650 are repeated to determine the two-dimensional offset for the next noise pattern in the noise pattern's coordinate system. Once all the noise patterns have been considered step 540 ends by outputting the two-dimensional offsets, in the respective noise pattern's coordinate system, for each noise pattern.

The two-dimensional offsets between the window and each of the noise patterns determine the position of the centre of the window with respect to the surface pattern, and hence the scanner's platen 110. Each two-dimensional offset represents the position of the centre of the window in noise pattern coordinates modulo the size of the noise pattern that it was correlated against. Each two-dimensional offset has an integer part and a non-integer part. If the scanner was a perfect imaging device and the surface pattern 130 had been manufactured perfectly, the non-integer parts of the corresponding horizontal and vertical offsets for each of the noise patterns would be the same. This is because the digital image coordinates correspond to a two dimensional point that lies within one of the pixels of the grid that the noise patterns were written on, which is a 4 micron grid for the preferred embodiment. This grid is the same for each of the noise patterns, so the sub-pixel part of the offset should be the same for all the noise patterns. However, because imaging devices in general are not perfect, which also holds for the scanner 120, and because the manufacturing process of the surface pattern 130 is not perfect, noise is present in the system 100. As a result, the sub-pixel offsets are generally slightly different. This is accounted for by averaging the sub-pixel offsets from the nearest integer pixel position in noise pattern coordinate system.

The horizontal and vertical dimensions may be analysed independently, so without loss of generality only the horizontal coordinates are described here, the vertical coordinates are generated using the same process. If the horizontal offsets for each of the noise patterns are denoted $O_1$, $O_2$, and $O_3$ for noise patterns of horizontal size $N_1$, $N_2$, and $N_3$ respectively, then the rounded integer parts of the horizontal positions may be written as:

$R_1 = \text{floor}(O_1 + 0.5)$ $R_2 = \text{floor}(O_2 + 0.5)$ $R_3 = \text{floor}(O_2 + 0.5)$ \hfill (1)

and the fractional remainders are:

$F_1 = O_1 - R_1$ $F_2 = O_2 - R_2$.

$F_3 = O_3 - R_3$ \hfill (2)

Given these definitions, the nearest integer horizontal position of the centre of the window in digital image coordinates X is a number such that:

$X = O_1 \bmod N_1$, $X = O_2 \bmod N_2$, and $X = O_3 \bmod N_3$ \hfill (3)

Equations (1) to (3) form a system of equations which is a specific form of the Chinese Remainder Theorem for three remainders. Many methods of solving the Chinese Remainder Theorem are known in the art. Using one of these methods leads to the solution X which is the nearest integer horizontal position of the centre of the window with respect to the noise pattern's coordinate system, which is fixed with respect to the glass platen 110. The horizontal position given to sub-pixel accuracy is:

$H_x = X + (F_1 + F_2 + F_3)/3$ \hfill (4)

A further application of the Chinese Remainder Theorem to the vertical dimension and additional of the average of the fractional pixel part leads to the vertical position of the centre of the window with respect to the noise pattern's coordinate system, which is fixed with respect to the glass platen 110. Thus an accurate estimate of both the horizontal and vertical components of the position of the digital image coordinates with respect to the pattern 130 on the glass platen 110 has been determined.

Having described the method 500 of analysing the digital image produce by the imaging of the surface 210 through the surface pattern 130, the interpolation of the peak in the correlation image occurring in sub-step 640 (FIG. 7) is now described. The noise patterns making up the surface pattern 130 have a broad spectral bandwidth and a narrow autocorrelation signal.

Figure 8:
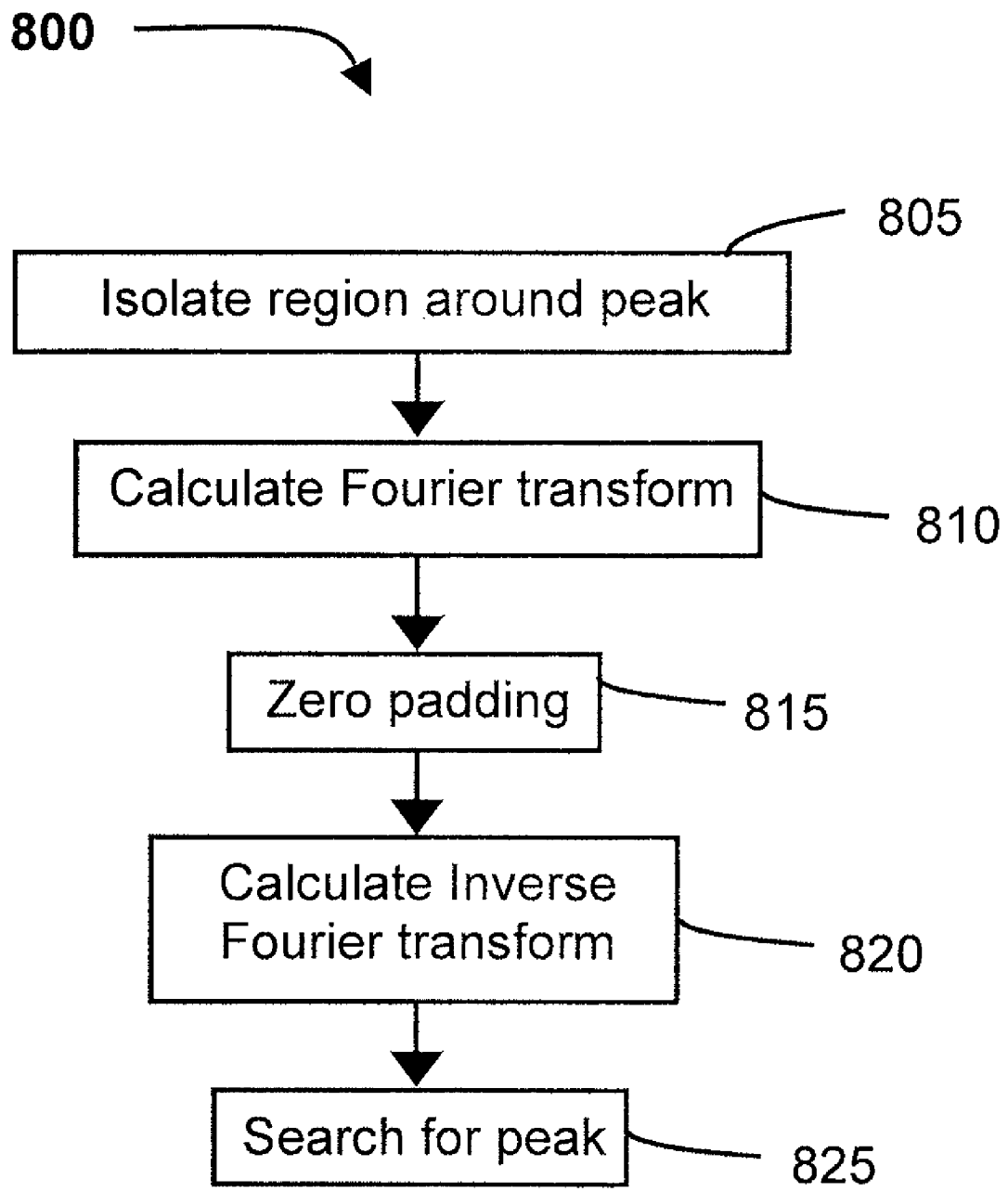
FIG. 8 is a schematic flow diagram of a method of interpolating a peak.

FIG. 8 shows a schematic diagram of a method 800 of interpolating the peak in the correlation image. The method 800 starts in step 805 where a region including a predetermined number of sample values of the correlation image is isolated around the peak. The resulting image is next up-sampled using Fourier interpolation and at a higher sample rate, which allows the underlying structure of the portion of the correlation image around the peak to become visible. The Fourier interpolation provides up-sampling with no loss or attenuation of higher frequency components of the correlation image. Zero padding is used to up-sample the portion of the correlation image around the peak. In particular, in step 810 the Fourier transform is calculated of the portion of the correlation image. The Fourier transform is then zero-padded in step 815 to include N times the number of samples in each dimension as does Fourier transform. The inverse Fourier transform is next performed in step 820 to form an up-sampled correlation image.

Finally, in step 825, a peak value is searched for in the up-sampled correlation image. The up-sampling results in an enhancement of the detected peak allowing the underlying value and its position to be better estimated.

The methods 500 and 800 are implemented in the computer 200 as software. The software may be stored in a computer readable medium, including the storage devices 209, for example. The software is loaded into the computer 200 from the computer readable medium, and then executed by the processor 205. A computer readable medium having such software recorded on it is a computer program product.

Computer readable media refers to any storage medium that participates in providing instructions and/or data to the computer 200 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer 200.

The foregoing describes only some embodiments of the present invention, and modifications and/or changes can be made thereto without departing from the scope and spirit of the invention, the embodiments being illustrative and not restrictive.

In describing the preferred embodiment of the invention reference was made to a scanner platen 110 that had a chrome pattern on it produced by standard UV lithographic techniques. It will be apparent to one skilled in the art that other methods of placing the noise patterns on the scanner platen 110 may be used, including, but not limited to, printing processes, optical projection processes, soft lithographic processes and the like.

It will be further noted that the preferred embodiment was described with reference to a flat bed scanner 120 in the measuring system 100, where the two-dimensional surface pattern 130 was embedded on the scanner's platen 110. The techniques described herein can be utilised by other imaging apparatus that require an accurate spatial calibration, including but not limited to still cameras, video cameras, microscopes, telescopes and the like. In these cases a transparent surface that contains the two-dimensional pattern is placed between the imaging system of the apparatus and the scene to be imaged. The output of that imaging device is analysed by the computer 200 using the methods outlined above to determine the position of the pixels in the output of the imaging device with respect to the surface containing the two-dimensional pattern.

As an example of such an alternative embodiment, a glass slide is produced with a two-dimensional pattern on its surface along with other registration marks to allow for estimation of the global transformation parameters. A specimen is then imaged through this glass slide and after the global transformation between the glass slide and the pixels of the imaging system has been determined through use of the other registration marks, the two-dimensional pattern is detected and analysed to give accurate two-dimensional distance measurements between parts of the image of the specimen.

Embodiments are also not limited to optical imaging systems. For example, the imaging device may be an x-ray imaging device, in which case a surface containing the surface pattern 130 is placed between the x-ray source and the imaging system of the x-ray imaging device, and preferably in contact with the imaging system.

Another alternative embodiment includes a paper substrate that has been prepared with a two-dimensional pattern on the substrate using offset printing. Imaging the paper substrate, and detecting and analysing the two-dimensional pattern allow accurate positioning information to be determined for any interesting features that have been placed on the paper, subject to the accuracy of the original offset printing process.

The preferred embodiment of the invention uses a surface pattern 130 which consists of three sub-patterns, and in particular three noise patterns, repeating with period 63, 64 and 65 grid positions square. Two or more sub-patterns may be used. Also, the sub-patterns may have other sizes, though it should be noted that the combined pattern will repeat with a period which is equal to the lowest common multiple of the sizes used.

The sub-patterns may only repeat with different spatial periods in one direction to form the two-dimensional pattern.

Yet further, the preferred embodiment uses a surface pattern 130 consisting of square noise patterns. Non-square noise patterns may be used with different periodicities in the horizontal and vertical directions. The markings making up the noise patterns were also described as being square. Non-square and non-rectangular markings may also be used.

As noted in the "Background art" section, often the visual appearance of the captured image is very important. As such any image degradation that occurs during the capturing, such as the degradation resulting from the surface pattern 130 being superimposed over the surface 210 being measured, is undesirable. However, according to a further embodiment, after the position of the noise pattern in the digital image has been determined to high accuracy, the noise pattern is removed from the final digital image. Due to the small size of the markings making up the surface pattern, the pixel values in the digital image are not dominated by the markings. Instead, the presence of any markings overlaying the area of the surface 210 to be measured that corresponds to a single pixel merely attenuates the true intensity value of that area. Accordingly, knowing the number of markings affecting a particular pixel value allows for the reduction in intensity to be compensated for.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of determining a two-dimensional position of a location in an image, said method comprising the steps of:
    imaging by an imaging device a two-dimensional pattern, said two-dimensional pattern comprising a plurality of at least partially overlapping two-dimensional sub-patterns, wherein said sub-patterns repeat with different spatial periods in at least one dimension to form said two-dimensional pattern, and wherein the spatial periods of the sub-patterns are anharmonic;
    determining a two-dimensional offset for each of said sub-patterns at said location in the image formed by said imaging; and
    determining said two-dimensional position from said two-dimensional offsets.

2. The method as claimed in claim 1 wherein said different spatial periods are relatively prime.

3. The method as claimed in claim 1 wherein said sub-patterns are pseudo-random noise patterns.

4. The method as claimed in claim 1 wherein said two-dimensional offset for each of said sub-patterns at said two-dimensional position is determined through correlating a respective sub-pattern with an area in said image associated with said two-dimensional position.

5. The method as claimed in claim 1 comprising the further step of:
  compensating for degradation caused by said two-dimensional pattern in said image.

6. Apparatus for determining a two-dimensional position of a location in an image, said apparatus comprising:
  an imaging device for imaging a two-dimensional pattern, said two-dimensional pattern comprising a plurality of at least partially overlapping two-dimensional sub-patterns, wherein said sub-patterns repeat with different spatial periods in at least one dimension to form said two-dimensional pattern, and wherein the spatial periods of the sub-patterns are anharmonic;
  means for determining a two-dimensional offset for each of said sub-patterns at said location in the image formed by said imaging; and
  means for determining said two-dimensional position from said two-dimensional offsets.

7. The apparatus as claimed in claim 6 wherein said imaging device comprises a flat-bed scanner and said two-dimensional pattern is formed on a platen of said scanner.

8. The apparatus as claimed in claim 6 wherein said imaging device comprises one of:
  a camera;
  a microscope;
  a telescope; and
  an X-ray device,
  and said two-dimensional pattern is formed on a surface placed in front of an imaging system of said device.

9. The apparatus as claimed in claim 7 wherein said two-dimensional pattern is formed through forming chrome particles on a glass surface.

10. The apparatus as claimed in claim 7 wherein said two-dimensional pattern is formed through a lithographic process.

11. The apparatus as claimed in claim 7 wherein said two-dimensional pattern is formed through a printing process.

12. The apparatus as claimed in claim 7 wherein said two-dimensional pattern is formed through an optical projection process.

* * * * *